Jan. 28, 1969   L. T. ATKINS   3,424,450
SHAPING TEMPLATE CLAMP
Filed Jan. 10, 1966   Sheet 1 of 2

INVENTOR.
LEROY T. ATKINS
BY
Paul A. Weilein
ATTORNEY

INVENTOR.
LEROY T. ATKINS
BY
Paul A. Weilein
ATTORNEY

United States Patent Office 3,424,450
Patented Jan. 28, 1969

3,424,450
SHAPING TEMPLATE CLAMP
Leroy T. Atkins, 1892 N. Ave. 51,
Los Angeles, Calif. 90042
Filed Jan. 10, 1966, Ser. No. 519,681
U.S. Cl. 269—87.1
Int. Cl. B25b 1/08; B23g 27/00
7 Claims

ABSTRACT OF THE DISCLOSURE

A clamp for workpieces comprises an upper plate and a lower plate interconnected by a central bolt with a cam pivotally mounted on the bolt for operation by a handle for the clamping action. Attached to at least one of the plates is jig means for guidance in shaping workpieces.

---

This invention relates to a template clamp for holding work in the desired position with respect to template means by which the work may be shaped with a rotary shaping cutter or similar tool.

It is an object of this invention to provide a template clamp which has a simplicity of construction and a versatility beyond that of clamps or jigs heretofore available, in that it includes especially constructed clamping means and clamping members between which latter work may be inserted at any of the margins of such members throughout 360 degrees and clamped in a position to permit of the desired shaping thereof according to template means associated with the clamping members.

It is another object of this invention to provide a template clamp such as next above noted wherein at least one of the clamping members carries template means and readily may be removed from the clamp whereby a clamping member providing a different form of template means readily may be operatively connected with the clamp.

Further, it is an object of this invention to provide a template clamp in which the foregoing and other objectives are achieved largely by reason of the construction of the clamping members and use of novel means for connecting the clamping members and forcibly clamping them against the work, wherein such connecting and clamping means is spaced from all outer margins of the clamping members to afford work holding operations and the location of template means optionally at any of the outer margins of the clamping members.

Another object of this invention is to provide a novel form of clamping means for the clamping members which applies a clamping pressure effectively and uniformly to a large area of the clamping members, thereby assuring reliable holding of work at various locations between the plates, depending upon the location and form of the template means that may be embodied in one or both clamping plates.

A further object is to provide a template clamp such as next above described having novel adjusting means for increasing or decreasing the spacing of the clamping members to provide for accommodation of work of different thicknesses and to also vary the clamping force of the clamping members, such adjusting means being operable upon rotation of a pivoted clamping lever which latter is normally but releasably held against rotation by novel means associated therewith.

Other objects and advantages of the invention will be hereinafter described or will become apparent to those skilled in the art, and the novel features of the invention will be defined in the appended claims.

Referring to the drawings.

Figure 1:
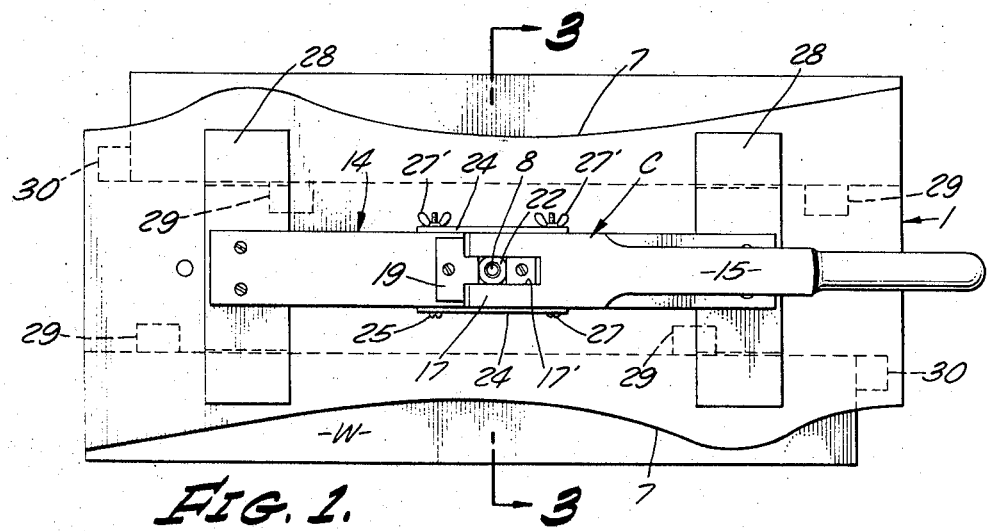
FIG. 1 is a top plan view of a shaping template clamp embodying the present invention.
Figure 2:
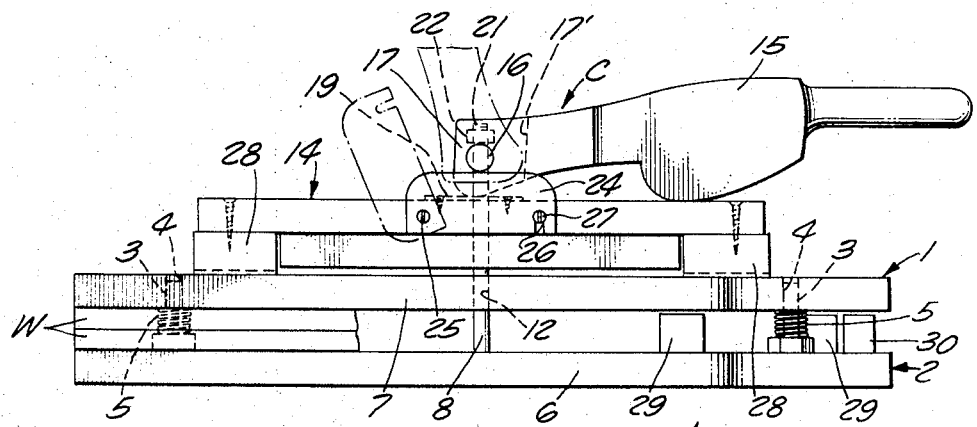
FIG. 2 is a fragmentary side elevation of the clamp.
Figure 3:
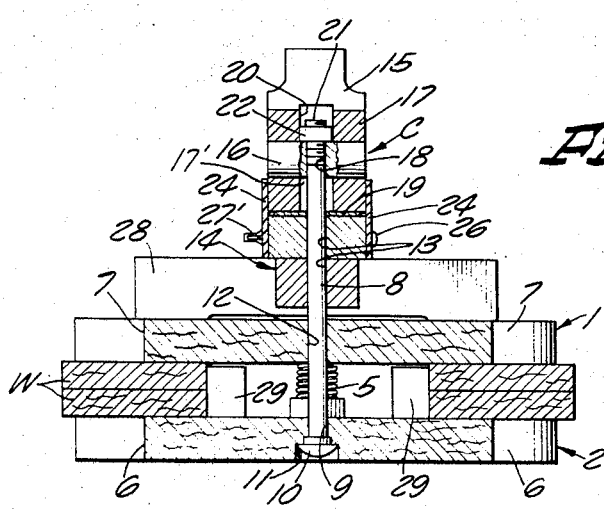
FIG. 3 is a sectional view taken on the line 3—3 of FIG. 1 on a slightly enlarged scale.

The embodiment of the present invention shown in FIGS. 1–3 includes an upper clamping member 1 and a lower clamping member 2 in the form of plates of substantially the same size and here shown as elongate but which obviously may be of other shapes provided they will be operable to hold work in position with respect to template means to permit of shaping the work by means of a suitable tool according to the template means.

The members or plates 1 and 2 are constructed so that when supported in vertically spaced relation to one another, all outer margins thereof are spaced to permit insertion of work W between any of such margins. Accordingly, yieldable spacing means is provided to permit of placing work therebetween. This spacing means comprises guide pins 3 carried by the lower plate 2 and slidable in openings 4 in the upper plate 1 with coiled springs 5 thereon to yieldably hold the plates spaced apart.

At least one of the clamping members or plates 1 and 2 may have template means embodied therein. As here shown, however, the lower plate 2 has like template means 6 extending along and formed as both longitudinal edges thereof, while the upper plate 1 has like template means 7 extending along and formed as both longitudinal edges thereof.

With this arrangement and upon operation of novel clamping means generally designated C and which will be hereinafter fully described, a plurality of pieces of the work W, for example pairs thereof as here shown, may be clamped between longitudinal edge portions of the plates 1 and 2 for shaping according to the templates 6 and 7. Thus, with each application of a shaping cutter (not shown) a plurality of workpieces may be shaped at the same time and the resultant shaped workpieces may be matched, for example, to provide like chair arms or other similar matched elements.

The clamping means C for the plates 1 and 2 includes a bolt 8 inserted through an opening 9 approximately centrally of the lower plate 2. The head 10 of the bolt non-rotatably engages a counterbore 11 in the opening 9 and is also thereby anchored to and held against upward withdrawal from the plate 2. The bolt 8 extends further upwardly through an opening 12 in the upper plate 1 and an opening 13 in an elongate pressure applying beam 14 and is pivotally connected to a clamping lever 15. A pivot pin 16 in the eccentric or cam head 17 of the lever 15 has an opening 18 therein through which the bolt 8 extends after passing upwardly through the vertical slot 17' in the cam head, thereby pivoting the lever on the bolt. The eccentric or cam head 17 of the lever 15 is formed so that as the lever is lowered from elevated position shown in broken lines in FIG. 2, to the full line showing, the upper plate 1 will be forced downwardly to clamp work between the clamping plates, the head 17 working on a metal wear plate 19 fastened atop the beam 14.

Means for adjusting plates 1 and 2 to vary the spacing thereof and to also vary the clamping force effected by the lever 15, is embodied in the bolt 8 and lever 15 wherein the latter above the pivot pin 16 receives in the upper part 20 of the slot 17' in the head 17 the screw threaded upper portion 21 of the bolt 8 also a nut 22 mounted on the threaded portion of the bolt. The fit of the nut 22 in the slot portion 20 is such that when the lever is rotated about the bolt 8 as an axis, the nut 22 will be turned on the bolt. Accordingly, rotation of the lever clockwise will turn the nut so that it will screw down on the bolt and thus take up the bolt and move the upper plate 1 closer to the lower plate 2. Opposite rotation of the lever will turn the nut so that the space between the plates is increased. As the nut 22 bears against the pivot pin 16, the lever head 17 is moved toward or away from the pressure beam 14 with the turning of the nut upon rotation of the lever 14, thus the pressure exerted by the head 17 is increased or decreased depending upon the direction in which the nut is turned.

Means are provided for releasably holding the lever 15 against rotation while permitting pivotal movement of the lever to clamp and release the clamping plates 1 and 2. This means includes a pair of plates 24 pivoted on a headed fastener 25 and adapted to be swung on these pivots to bear against opposite sides of the lever head 17. When in this position, notches 26 in the plates 24 engage headed fasteners 27 to hold the plates in position to prevent rotation of the lever about the bolt 8 as an axis. Wing nuts 27' on the fasteners 25 and 26 provide for clamping the plates in place. When the plates are raised as shown in FIG. 2, the lever is free to be rotated about the axis provided by the bolt 8 to make the desired adjustments hereinbefore described.

The pressure beam 14 extends for the greater portion of the length of plates 1 and 2 and at its end is provided with transversely extending pressure applying blocks or members 28 that bear upon the upper face of the upper clamping plate 1 near the ends of this plate. With this arrangement the clamping pressure is applied to the plates 1 and 2 over a wide area and thus assure that workpieces will be securely held in the desired positions with relation to the template edges 6 and 7 of the two clamping plates, whether the workpieces are disposed longitudinally of the plates or at the ends of the plates, it being noted that template means could be provided across the ends of the plates if desired and workpieces clamped at such ends, since the clamping force applied by the beam 14 and end members 28 will make this alternate arrangement possible.

Stop members 29 are arranged on the lower clamping plate 2 so as to engage the inner longitudinal edges of the workpieces W to limit the inward extension of such pieces so that they will project outwardly sufficiently beyond the template edges 6 and 7. A similar stop member 30 is provided on the plate 2 to engage ends of the workpieces to hold them against axial displacement between the clamping plates.

Figure 4:
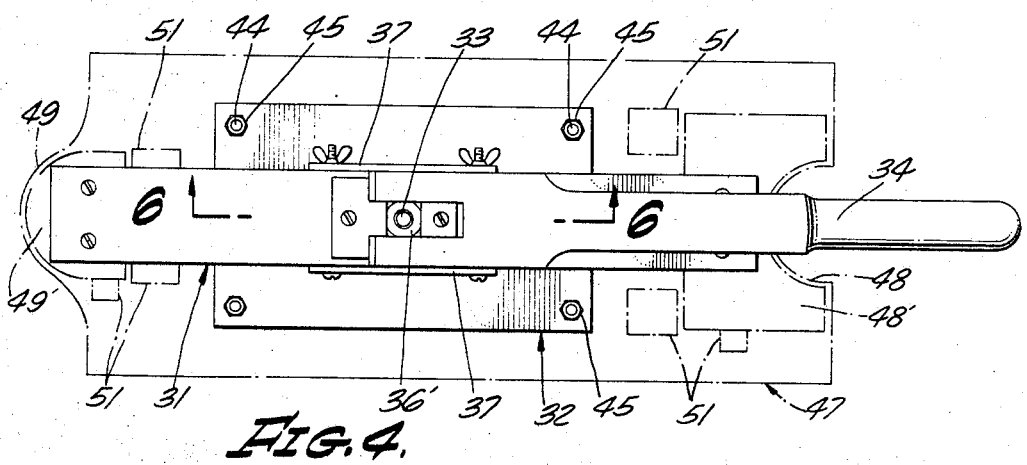
FIG. 4 is a top plan view of a modified form of clamp embodying the present invention.
Figure 5:
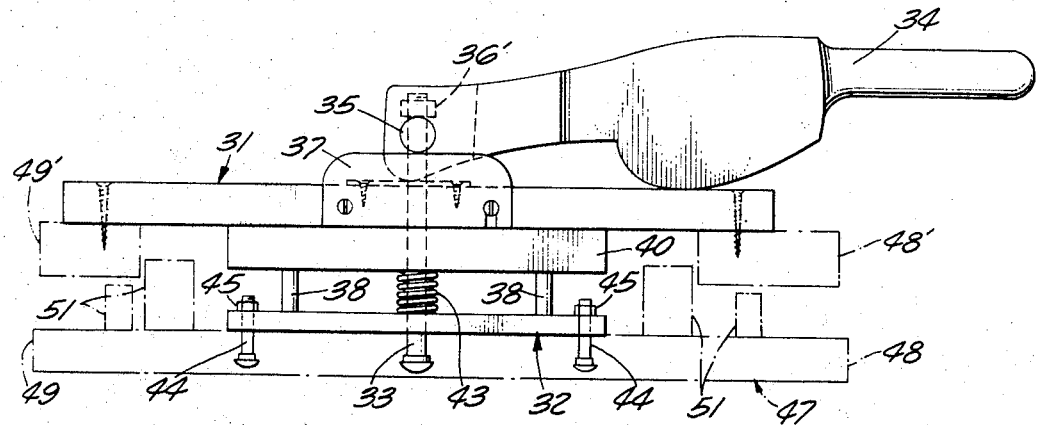
FIG. 5 is a side elevation of the clamp shown in FIG. 4.
Figure 6:
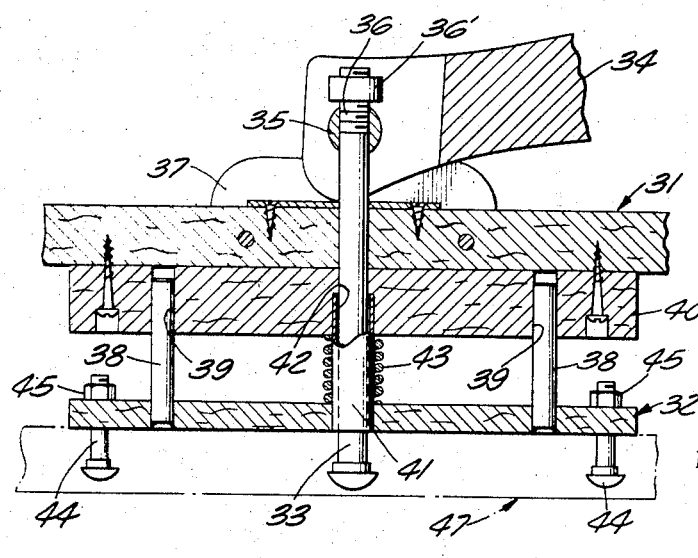
FIG. 6 is an enlarged fragmentary sectional view taken on the line 6—6 of FIG. 4.

A modified form of this invention shown in FIGS. 4, 5, and 6 differs primarily from the clamp shown in FIGS. 1, 2, and 3 in that a pressure applying member or beam 31 is employed as a work clamping member instead of an upper clamping plate such as the plate 1. An attaching plate 32 of metal has a bolt 33 extending therethrough which corresponds to the bolt 8 shown in FIGS. 1–3, there being a lever 34 identical with the lever 15 and pivoted on the bolt by means of a pivot pin 35. The bolt extends through the pin and has a threaded upper end 36 on which a nut 36' is mounted. It is apparent that tightening the nut 36' on the threaded upper end 36 of the bolt 33 to bring the head of the bolt against the underside of the attaching plate 32, in effect, connects the attaching plate to the beam 31. Adjustment of the clamping means is effected in the same manner as shown in FIGS. 1–3, there being side plates 37 pivoted on the pressure beam 31 in the same manner and for the same purposes as the plates 24 shown in FIGS. 1–3.

Guide pins 38 are carried by the attaching plate 32 and are slideable in openings 39 in a member 40 that is fixed to the underside of the beam and constitutes a central portion of the beam 31.

As a means for yieldably holding the pressure beam 31 upwardly spaced from the attaching plate 32, the attaching plate 32 has a sleeve 14 fixed thereto and surrounding the bolt 33 and extending into an opening 42 in the center portion 40 of the beam 31. A coiled spring 43 surrounds the sleeve 41 and engages the plate 32 and the central portion 40 of the beam 31 at its ends to yieldably space the beam from the plate.

As the purpose of the attaching plate 32 is to provide for mounting suitable template means thereon, this plate is provided with bolts 44 and nuts 45 which are employed in securing template means to the plate.

The elements of this modified form of template clamp hereinbefore described are shown in full lines in FIGS. 4, 5, and 6 and these elements comprise a very flexible form of template clamp of simple construction making it possible readily and easily to incorporated therewith different forms of templates. As an example, the template means shown in broken lines in FIGS. 4, 5, and 6 is in the form of a rectangular plate 47 having at opposite end edges templates 48 and 49. Thus the plate 47 serves as a clamping member and completes this modified form of the clamp. The template 48, for example, may be of the recess or cut-out type, whereas the template 49 may be of the rounded protuberant type to form a rounded projection in a workpiece that matches the cut-out or recess formation of the other workpiece, it being noted that the two workpieces will be clamped between the plate 47 and pressure blocks 48' and 49' on the ends of the beam 31. The blocks 48' and 49' are secured by fastenings 50 to the end of the beam 31 and are shaped to correspond to the templates 48 and 49. Also provided on the plate 47 are stops 51 for engaging workpieces that are clamped between the plate 47 and the pressure applying blocks 48' and 49'.

It should be noted that the plates 47 and any similar template element employed will be formed with holes extending therethrough to accommodate the bolts 33 and 44. In this connection it should also be noted that the modified form of clamp as shown in full lines in FIGS. 4, 5, and 6 may have connected to the attaching plate 32 thereof different types of template elements.

The stop members 29 and 30 as shown in FIGS. 1, 2, and 3, are located on the lower clamping member or plate 2 according to the location of the particular template means carried by the member 2, and where template means other than as here shown are employed, the stop members are positioned in locations other than here shown. This is also the case with stop members on the member 47 shown in FIGS. 4, 5, and 6, and it will therefore be apparent that the clamping members in both forms of this invention make it possible to insert work therebetween throughout 360 degrees, that is, optionally between any of the outer margins of the clamping members.

The above noted feature and the particular clamping means including the elongate pressure beam and the adjustment afforded by the rotation of the clamping lever about the axis of the bolt, render the apparatus of this invention exceptionally versatile and an improvement in this art.

While specific structural details have been shown and described, it should be understood that changes and alterations may be resorted to without departing from the spirit of the invention as defined in the appended claims.

I claim:
1. A shaping template clamp, comprising:
   an upper clamping member;
   a lower clamping member,
   said clamping members being plates formed so that when spaced one above the other all outer margins thereof are unobstructed to permit of insertion of work between the clamping members at any of said margins;
   spacing means yieldably holding said members so spaced one above the other;
   template means located adjacent certain of the outer margins of said members; and
   clamping means connected to and operable to move said clamping members toward one another to clamp work therebetween in a position between said template means, said clamping means including:
  a bolt anchored to said lower clamping member and slidably extending through and above said upper clamping member;
  a clamping lever;
  means pivoting said lever to said bolt above said upper clamping member, said bolt extending through said pivot means and slidable relative thereto;
  means on said upper clamping member and said lever cooperable upon moving said lever on said pivot means into a predetermined position to move said clamping members together for clamping the work therebetween, said bolt having screw threads on a portion thereof;
  a nut threaded on said screw threads,
  said lever having a slot in which said nut is held against turning relative to said lever, said nut bearing against said pivot means, said lever being rotatable about said bolt as an axis to turn said nut on said bolt to move said clamping members toward and away from one another; and
  restraining means movable into and from a position preventing rotation of said lever about the bolt as an axis, said restraining means permitting said lever to pivot on the bolt when in position to prevent said rotation of said lever.

2. A shaping template clamp, comprising:
an upper clamping member;
a lower clamping member,
said clamping members being plates formed so that when spaced one above the other all outer margins thereof are unobstructed to permit of insertion of work between the clamping members at any of said margins;
spacing means yieldably holding said members so spaced one above the other;
template means located adjacent certain of the outer margins of said members; and
clamping means connected to and operable to move said clamping members toward one another to clamp work therebetwen in a position betwen said template means, said clamping means including:
  a bolt connected to said lower clamping member and extending slidably through said upper clamping member;
  an elongate pressure beam atop said upper clamping member,
  said beam having pressure applying members extending transversely across the ends of the beam in contact with said upper clamping member;
  said bolt extending slidably through said beam;
  a lever;
  means pivoting said lever on said bolt;
  cam means on said lever engageable with said beam to apply presure thereto and move said clamping members into work clamping position upon movement of said lever on said pivot means toward said beam,
  said lever being rotatable relative to said bolt about the axis of the bolt;
  adjusting means operatively associated with said bolt and said lever operable upon rotation of said lever about said bolt to vary the spacing of said clamping members from one another; and
  locking means on said beam movable between a position preventing said rotation of said lever and a position permitting said rotation of said lever.

3. In a shaping template clamp, the combination of:
an upper clamping member,
a lower clamping member comprising a clamping plate and an attaching plate releasably mounted thereon whereby one clamping plate may be substituted for another clamping plate,
said two clamping members being so formed that when spaced one above the other all outer margins thereof are unobstructed to permit insertion of work between the two clamping members at any of said margins;
spacing means yieldably holding said two clamping members spaced one above the other;
template means located adjacent certain of the outer margins of said clamping members;
a plurality of stop means extending upwardly from said clamping plate for abutment against work that is clamped between the two clamping members;
guide bores in said upper clamping member;
guide pins extending upwardly from the lower clamping member in sliding engagement with said bores; and
clamping means connected to and operable to move said clamping members towards one another to clamp work therebetwen in a position adjacent said template means, said clamping means including:
 a bolt slidable through said upper clamping member, said bolt being adapted to engage said attaching plate;
 a lever connected with said bolt; and
 means on said lever engageable with said upper clamping member for moving said two clamping members towards each other.

4. In a shaping template clamp, the combination of:
an upper clamping member,
a lower clamping member comprising a clamping plate and an attaching plate releasably mounted thereon whereby one clamping plate may be substituted for another clamping plate,
said two clamping members being so formed that when spaced one above the other all outer margins thereof are unobstructed to permit insertion of work between the two clamping members at any of said margins;
spacing means yieldably holding said two clamping members spaced one above the other;
template means located adjacent certain of the outer margins of said clamping members;
a bolt-like member extending upwardly from said lower clamping member through said upper clamping member,
a lever above the upper clamping member connected to said bolt-like member and having a cam portion to bear on the upper clamping member to place said bolt-like member under tension to move the two clamping members towards each other to clamp work therebetween,
said lever being rotatable about the axis of the bolt-like member; and
means responsive to rotation of the lever about said axis to vary the effective length of the bolt-like member.

5. A combination as set forth in claim 4 including restraining means for preventing rotation of the lever, said restraining means being pivotally mounted on said upper clamping member to swing relative thereto into and out of engagement with said clamping lever.

6. A combination as set forth in claim 5 in which said restraining means straddles the clamping lever at the restraining position of the restraining means.

7. A shaping template clamp, comprising:
an upper clamping member;

a lower clamping member, said clamping members being plates formed so that when spaced one above the other similarly positioned outer marginal portions thereof are unobstructed to permit of insertion of work between the clamping members at said portions;

means guidingly holding said members one above the other;

template means located adjacent certain of said similarly positioned outer marginal portions on at least one of said members; and clamping means connected to and operable to move said clamping members toward one another to clamp work therebetwen in a position adjacent said template means, said clamping means including:
- a bolt anchored to said lower clamping member and slidably extending through and above said upper clamping member;
- a clamping lever;
- means pivoting said lever to said bolt above said upper clamping member, said bolt extending through said pivot means and slidable relative thereto;
- means on said upper clamping member and said lever cooperable upon moving said lever on said pivot means into a predetermined position to move said clamping members together for clamping the work therebetwen, said bolt having screw threads on a portion thereof;
- a nut threaded on said screw threads,
  said lever having a slot in which said nut is held against turning relative to said lever, said nut bearing against said pivot means,
  said lever being rotatable about said bolt as an axis to turn said nut on said bolt to adjustably vary the clamping pressure of said clamping members.

References Cited

UNITED STATES PATENTS 1,101,624   6/1914   Faubel _____ 269—87.1

FOREIGN PATENTS 636,506   4/1928   France.

LESTER M. SWINGLE, *Primary Examiner.*

D. R. MELTON, *Assistant Examiner.*

U.S. Cl. X.R.

269—236